May 19, 1953 D. W. BLANCHER 2,639,379

ELECTRONIC SWITCHING AND MIXING CIRCUIT FOR PULSATING DIRECT CURRENT

Filed Oct. 16, 1950

INVENTOR.
D. W. Blancher

BY

[signature]

ATTORNEY

Patented May 19, 1953 2,639,379

UNITED STATES PATENT OFFICE 2,639,379

ELECTRONIC SWITCHING AND MIXING CIRCUIT FOR PULSATING DIRECT CURRENT

Donald W. Blancher, North Hollywood, Calif., assignor to Bendix Aviation Corporation, South Bend, Ind., a corporation of Delaware Application October 16, 1950, Serial No. 190,429

3 Claims. (Cl. 250—27)

1

This invention relates to electronic circuits for alternately blocking and passing direct currents at a rapid rate without the use of mechanical switches.

An object of the invention is to provide a simple and reliable circuit without mechanical switches for alternately blocking and passing a direct current without appreciable distortion thereof.

Another object is to alternately pass short increments of two direct currents to a common circuit at a rapid rate whereby they can be impressed upon the vertical deflection plates of a single cathode ray oscilloscope in rapid succession to produce thereon two simultaneously visible curves showing the respective magnitudes of the two currents.

Other more specific objects and features of the invention will appear from the description to follow:

A system in accordance with the invention for alternately blocking and passing a single unidirectional current includes a tube having a cathode, control grid and anode in which the cathode and anode are in series with the source of direct current to be switched, and the grid is alternately swung sufficiently negative to block conduction through the tube, and sufficiently positive to produce linear conduction characteristics between the cathode and anode. The desired variable grid voltage may be produced by a square wave oscillator such as a multi-vibrator, and is applied through a condenser to the grid; a resistor network and the grid conductance being used to determine the positive and negative limits of grid voltage swing.

Two such circuits operating in phase opposition under control of the same multi-vibrator oscillator can be used to alternately apply short increments of two separate direct currents to a single circuit such as the vertical deflection plates of a cathode ray oscilloscope.

A full understanding of the invention may be had from the following detailed description read in connection with the drawing, in which.

2

Figure 5:
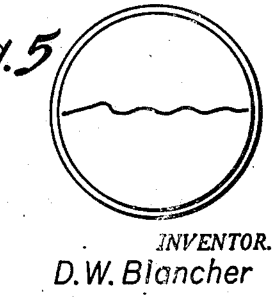

Fig. 5 is a view of the oscillograph screen of the system showing how two signals may be added to produce a single curve thereon.

Figure 1:
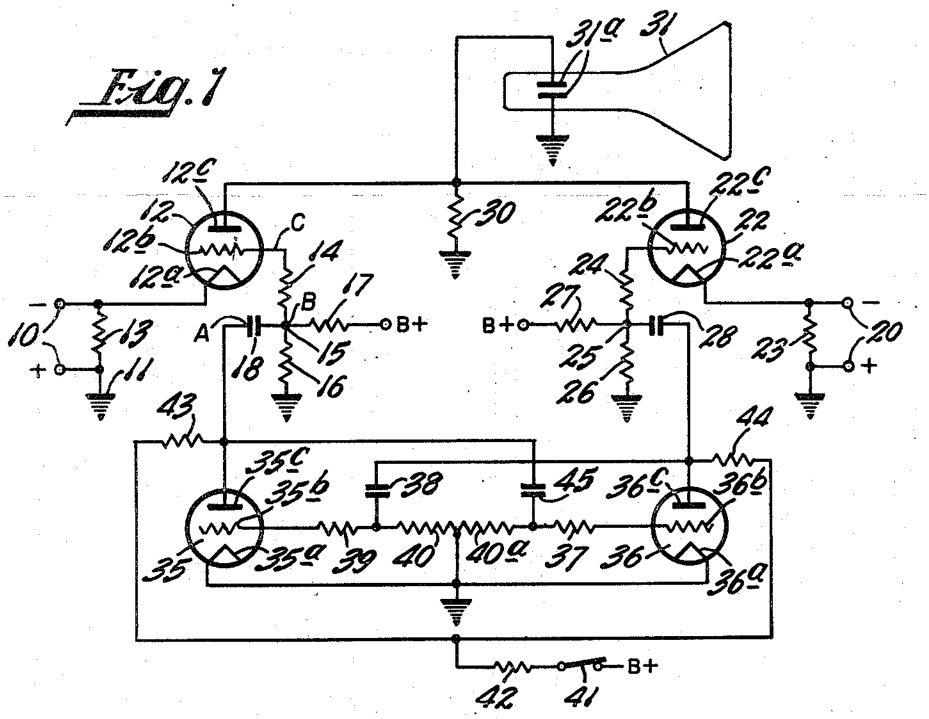
Fig. 1 is a schematic circuit diagram of a system in accordance with the invention.

Referring first to Fig. 1, the circuit therein disclosed comprises a first pair of input terminals 10 to which one signal is to be applied, which terminals are connected between ground 11 and the cathode 12a of a vacuum tube 12. The terminals 10 are shunted by an input resistor 13. The tube 12 has a grid 12b which is connected by a series grid resistor 14 to a terminal 15 which is in turn connected to ground by a grid leak resistor 16. The terminal 15 is also connected through a resistor 17 to a source of B plus potential and to one terminal of a condenser 18.

A second set of input terminals 20 is connected between ground and the cathode 22a of a second vacuum tube 22. The grid 22b of this second tube is connected through a series grid resistor 24 to a terminal 25 which is also connected to ground by a resistor 26, to a source of B plus potential through a resistor 27, and to one terminal of a condenser 28.

The anodes 12c and 22c of the two tubes are connected to ground through a common load resistor 30, and the vertical deflection plates 31a of an oscilloscope 31 are connected in shunt to the resistor 30.

The tubes 12 and 22 can be made conductive or non-conductive by the impression of suitable potentials upon the grids 12b or 22b. If both tubes are conductive then two signal currents applied to the input terminals 10 and 20 respectively will be added and their integrated result will be impressed upon the deflection plates 31a of the oscilloscope. On the other hand, if one tube is rendered non-conductive by the impression of a sufficiently high negative potential on its grid, and the other tube is made conductive by the impression of a suitable less negative or positive potential on its grid, then only the signal applied to the conductive tube will reach the deflection plates 31a of the oscilloscope.

In accordance with the invention, the signal currents impressed upon the input terminals 10 and 20 respectively are alternately applied to the deflection plates 31a by alternately rapidly changing the potentials of the grids 12b and 22b inversely with respect to each other. This is accomplished by alternately applying positive and negative potentials through the condenser 18 to the point 15 and simultaneously alternately applying negative and positive potentials through the condenser 28 to the point 25.

The desired positive and negative switching potentials may readily be obtained from a multivibrator oscillator circuit. As shown in Fig. 1, such a circuit comprises a pair of vacuum tubes 35 and 36 having their cathodes 35*a* and 36*a* connected to ground, having the anode 35*c* of tube 35 connected through a condenser 45 and a resistor 37 to the grid 36*b* of tube 36, and the anode 36*c* of tube 36 connected through a condenser 38 and a resistor 39 to the grid 35*b* of tube 35. The resistors 40 and 40*a* provide the grid return to ground paths for tubes 35 and 36. The anodes 35*c* and 36*c* of the two tubes may be energized from a common source of B plus potential through a switch 41, a common resistor 42 and individual resistors 43 and 44 respectively. As is well known, when the switch 41 is closed, the multi-vibrator oscillator disclosed will oscillate, at a frequency determined by the constants of the circuit, to produce substantially square topped waves at the anodes 35*c* and 36*c*, which waves are exactly 180° out of phase with each other. The two waves 180° out of phase with each other are applied through the condensers 18 and 28 respectively to the terminals 15 and 25 respectively.

Figure 2:
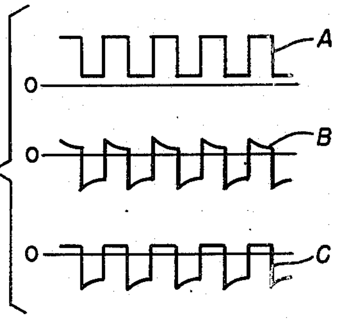
Fig. 2 is a set of curves showing the switching potentials developed at certain points in the circuit of Fig. 1.

Referring to Fig. 2, the upper curve A represents the potential variations at the anode 35*c* of the tube 35, which is connected to the left terminal A of the condenser 18. It will be observed that this wave is substantially square-topped or at least has substantially vertical sides of substantial magnitude. When point A in Fig. 1 goes positive there is a tendency for current to flow directly from ground through the resistor 16, and indirectly from ground through the grid series resistor 14, the grid 12*b* and cathode 12*a* of tube 12, and the resistor 13 to ground. The series grid resistor 14 is of substantially lower value than the grid leak resistance 16. Because of the relatively low resistance of the path including the resistor 14, the grid cathode path of the tube 12 and the input resistor 13, considerable current flows to ground over this path in response to the application of positive pulses from the multi-vibrator to point A. On the other hand, when the potential at point A reverses and becomes negative, no current can flow through the resistor 14 and through the tube 12 and the resistor 13 to ground, because of the unidirectional conduction characteristics of the tube. Hence the only flow to ground is through the grid leak resistor 16 (of relatively high value). The result is that the potential variations at the point B vary over a different range than do the variations at point A, and, as shown by curve B in Fig. 2, the potential at point B varies between a relatively low positive value and a relatively high negative value. The positive half wave is sufficient to make the tube 12 conductive, whereas the negative half wave is sufficient to completely block the tube.

The curve B is not flat-topped because the condenser 18 charges and discharges to a certain extent during each half wave. However, the positive half wave applied to the grid 12*b* (point C) is, as shown by curve C in Fig. 2, substantially flat-topped. This is because of the fact that for positive pnlses, the grid-cathode resistance of the tube 12 is small relative to the resistance of the series grid resistor 14. In practice, the input resistor 13 may have a value of 600 ohms, the series grid resistor 14 may have a value of 470,000 ohms, the grid leak resistor 16 may have a resistance of 1 megohm, and the condenser 18 may have a capacity of 0.1 mfd. With these values, it is found that if the wave A supplied by the multivibrator oscillator varies between plus 40 volts and plus 260 volts, the potential at point B, as shown by the curve B in Fig. 2, will decrease from an initial positive value of about 47 volts to a value of plus 37 volts and will then drop to a negative value of minus 183 volts. Because of the conduction characteristics of the tube, and the drop in the series grid resistor 14, the potential at the grid of the tube during the positive cycle, as shown by curve C in Fig. 2, will be approximately 1 volt positive. This is sufficient to make the tube conductive, so that a D. C. potential applied between the terminals 10 will be conducted through the tube to the output resistor 30 without distortion and without appreciable reduction in potential. During the other half cycle, the grid 12*b* of tube 12 is so negative with respect to the cathode 12*a* that the tube is completely non-conducting. Hence potential on the input terminals 10 will be applied to the deflection plates 31*a* of the oscilloscope during one half cycle, and completely interrupted during the next half cycle.

Signals are conducted through the tube 12 without amplification, because of the series grid resistor 14, which causes the grid to remain at substantially the same potential with respect to the cathode irrespective of the variations in signal potential on the cathode. As an example, in the absence of a signal voltage, a potential of approximately 1 volt positive (see curve C, Fig. 2) is maintained on the grid 12*b*. Now, if a signal of 2 volts negative is applied to the cathode, the charging current of the condenser 18 through vacuum tube 12 would increase due to the 2 volt signal. The increased grid current results in an increased drop across the series grid resistor 14, thereby cancelling the difference in potential between the grid and the cathode caused by the signal. When the signal is changed, the drop across the series resistor 14 changes accordingly, always producing a degenerative or bucking effect. Hence no amplification takes place in the tube 12, because of the degenerative characteristics of the circuit, and a pulsating unidirectional signal applied to the input terminals 10 will be passed without destroying the D. C. reference level thereof or any other characteristic of the signal.

The other half of the circuit, involving the input terminals 20, is identical with that half involving the input terminals 10, except that the condenser 28 has applied thereto a square-topped wave from the multi-vibrator oscillator that is 180 degrees out of phase with that applied to the condenser 18. Hence, the tube 22 is alternately conductive and non-conductive to signals applied to the terminals 20, but its conductive and non-conductive periods are staggered with relation to those of the tube 12, so that signals from the input terminals 10 and 20 respectively are alternately applied to the vertical deflection plates 31*a* of the oscilloscope 31. The result is that the electron beam in the oscilloscope 31 is alternately subjected to the signal potential on terminals 10 and that on terminals 20, with the result that two discontinuous curves are produced. By employing a multi-vibrator that oscillates at a frequency high relative to the time of persistence of vision, the single oscilloscope will provide two curves that appear to be continuous to the eye. This permits the continuous display of two independent curves representing two independently varying functions on the screen of a single oscilloscope.

Figure 3:
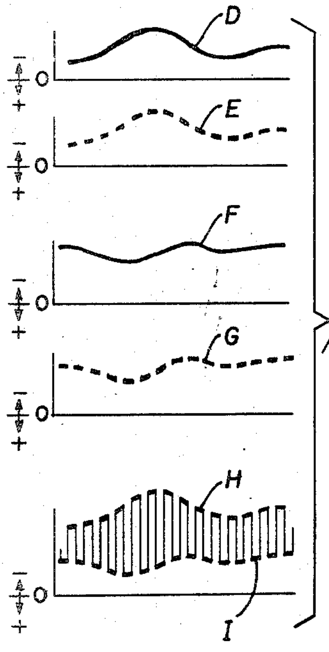
Fig. 3 is a set of curves showing the signal potentials at certain points in the circuit of Fig. 1.
Figure 4:
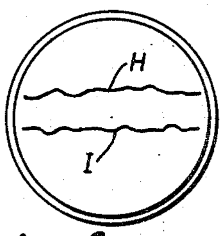
Fig. 4 is a view of the oscillograph screen of the system, showing how the separate curves of two signals may appear thereon.

In Fig. 3 the combining of the two currents and their alternate switching is explained with short sections of graphs showing the current amplified as to time. Curve D is the continuous curve representing variations in the magnitude of the unidirectional potential applied to terminals 10. Curve E is the discontinuous signal current passed by the tube 12 in response to this signal. Curve F shows the continuous or unidirectional signal applied to terminals 20, and curve G is the discontinuous signal current passed by the tube 22. It will be observed that the increments making up the curve E are staggered with respect to those making up curve G, and the currents represented by curves E and G will produce curves on the screen of the oscilloscope corresponding to curves H and I respectively. As shown in Fig. 3, curves H and I are clearly discontinuous, but if their frequency of interruption is high enough these curves H and I will appear continuous on the oscilloscope screen, as shown in Fig. 4.

It is sometimes desired to combine two signal currents, such as the signal currents applied to the input terminals 10 and 20 respectively to produce a single curve corresponding to the sum of the two signal currents. A curve representing this summation can be produced with the apparatus of Fig. 1 by opening the switch 41 to thereby cut off the B supply from the multivibrator and disable it. Under this condition, no A. C. impulses are applied through the condensers 18 and 28 to the switching circuit, and the grids 12b and 22b assume a constant slightly positive value such as to render their associated tubes simultaneously conductive. This desired average potential is obtained by virtue of the connection of the terminals 15 and 25 to the B-plus supply, through the resistors 17 and 27. In practice, when the resistors 14, 16 and 13 have the values previously given, the resistors 17 and 27 may each have a value of 2 megohms, which will result in a positive potential of approximately 1 volt on the grids of the tubes when no signal is applied thereto. However this voltage will remain substantially constant despite variations in the signal voltage, because of the degenerative effect of the circuit, as previously described.

Although for the purpose of explaining the invention, a particular embodiment thereof has been shown and described, obvious modifications will occur to a person skilled in the art, and I do not desire to be limited to the exact details shown and described.

I claim:

1. Apparatus for switching a unidirectional signal potential comprising: an electronic tube having a cathode, grid and anode; input and output resistors connected in series between said cathode and anode, the juncture of said resistors constituting a reference terminal; means for applying the said unidirectional signal potential across said input resistor, with its negative polarity connected to said cathode; a condenser, and a grid resistor connecting one terminal thereof to said grid; a source of periodically varying potential of substantially square wave form and means connecting it between the other terminal of said condenser and said reference terminal, the variations of potential of said source being of substantially larger order of magnitude than said signal potentials; and resistance means connecting said one terminal of said condenser to said reference terminal, said grid resistor being of lower resistance than said last mentioned resistance means, and both being large relative to said input resistor, and said condenser being sufficiently large relative to said resistance means and the frequency of said source to maintain a substantial charge during each half cycle of said source.

2. Apparatus according to claim 1 including a source of biasing potential having its negative terminal connected to said reference terminal, and a resistor of high value relative to said resistance means connecting said other terminal of said condenser to the positive terminal of said source of biasing potential.

3. Apparatus for alternately applying unidirectional signal potentials from two separate sources to a single output circuit comprising first and second circuits each including: an electronic tube having a cathode, grid and anode, an input resistor connected between said cathode and a common terminal, a condenser, and a grid resistor connecting one terminal of said condenser to said grid, a grid leak resistor connecting said one terminal of said condenser to said common terminal, said grid resistor being of lower resistance than said grid leak resistor, and both being large relative to said input resistor; means connecting one of said sources of unidirectional signal current across the input resistor of said first circuit, and means connecting the other source of unidirectional signal current across the input resistor of said second circuit, each source having its negative terminal connected to the cathode of the associated tube; a source of periodically varying potential of substantially square wave form and having first and second output terminals supplying similar waves opposite in phase; means connecting said first output terminal to the other terminal of the condenser in said first circuit, and connecting said second output terminal to the other terminal of the condenser in said second circuit, said condensers being sufficiently large relative to said grid leak resistors and the frequency of said square wave source as to maintain a substantial charge during each half cycle of said square wave; and means connecting the anodes of said tubes together and to said single output circuit.

DONALD W. BLANCHER.

References Cited in the file of this patent

UNITED STATES PATENTS

| Number | Name | Date |
|---|---|---|
| 2,301,254 | Carnahan | Nov. 10, 1942 |
| 2,428,126 | Nicholson | Sept. 30, 1947 |